Patented Feb. 22, 1949

2,462,555

UNITED STATES PATENT OFFICE 2,462,555

COPOLYMERS OF STYRENE AND 4,4'-DIVINYL-BIPHENYL

Fritz Rosenthal, Crescent Park, Bellmawr, N. J., assignor to Radio Corporation of America, a corporation of Delaware No Drawing. Application November 24, 1945, Serial No. 630,684

8 Claims. (Cl. 260—86)

This invention relates to the preparation of new resinous copolymers. More particularly, it relates to the preparation of a new cross-linked copolymer of 4,4'-divinyl-biphenyl and polystyrene.

The preparation of 4,4'-divinyl-biphenyl in monomeric form is the subject of a co-pending application, Serial No. 630,683, filed Nov. 24, 1945. Since the compound 4,4'-divinyl-biphenyl had not been successfully prepared before the invention set forth in the above identified application the copolymerizing of said compound and resinous materials such as polystyrene was, of course, not hitherto possible.

Other cross-linked copolymers of polystyrene have been known to chemists. For example, H. Staudinger and W. Heuer (Berichte, 67, 1159–1164 (1934)) discovered that a small addition of divinyl benzene to styrene monomer forms polymers having desirable qualities not possessed by polystyrene alone after being subjected to conditions favoring polymerization. The addition agent copolymerizes with the polystyrene in such a way that it forms connecting links or cross-links between individual chains of the formula $(-CH_2-CHX-)_n$. Cross-linked high polymer chains are three-dimensional molecules which are characterized by higher heat resistance, for example, than unlinked, linear high polymer chains.

One object of the present invention is to provide a method of preparing resinous copolymers containing 4,4'-divinyl-biphenyl.

Another object is to provide a method of preparing resinous copolymers containing 4,4'-divinyl-biphenyl and polystyrene.

Another object of the invention is to provide new cross-linked copolymers of polystyrene.

Another object is to provide new resinous copolymers containing 4,4'-divinyl-biphenyl.

In general, the copolymer may be prepared by adding to a styrene monomer a small amount such as 1–3 percent of its weight of 4,4'-divinyl-biphenyl. The components are then heated preferably in the presence of a catalyst until the polymerization reaction is completed. Copolymerization may also be effected in the presence of a solvent such as toluene or in aqueous emulsion using suitable emulsifying agents.

Example 1

To a suitable amount of styrene monomer was added 2 percent of its weight of 4,4'-divinyl-biphenyl. To this was added a small amount of benzoyl peroxide as a polymerization catalyst. This mixture was heated for three days at 75° C. at the end of which time a copolymer having improved properties was obtained.

Example 2

To 50 cc. water were added 20 g. of styrene and 1 g. 4,4'-divinyl-biphenyl dissolved in 5 cc. acetone. An emulsion was then prepared with the aid of 100 cc. of 5 percent aqueous sodium oleate solution. 1 g. potassium persulfate was added as a polymerization catalyst. This emulsion was heated at 75° C. for 6 hours and the product precipitated by pouring into a concentrated salt solution.

Many of the catalysts can be used which are used in the polymerization of styrene, itself. For example, in addition to benzoyl peroxide, other peroxides such as t-butyl hydroperoxide and acetyl peroxide may be used. But it is also possible to obtain the product without using any catalyst at all. Time and temperature of heating may be widely varied. As a rule the lower the temperature the longer the heating time and this latter may vary from a few hours to several days.

The copolymers of styrene obtained by this process will withstand, even for many hours, a temperature of 200° C. without deformation when no load is applied while unmodified polystyrene changes to a viscous liquid under the same conditions. The conventional heat distortion test results in a heat distortion point 9–11° C. higher than polystyrene tested under the same conditions.

Although the copolymers have much better heat distortion and other heat resistant properties than has polystyrene, alone, the power factor of the copolymers is at least equal to that of polystyrene. Thus the new substances are excellent electrical insulators and can be used for coating transformer coils where the power load is heavy and considerable heat is generated.

The new copolymers also are excellent coating agents, in general, and besides being useful for coating wire can be used for coating glass, paper, cloth, ceramics, wood and almost any other surface able to be coated or impregnated by polystyrene.

It has also been found that the copolymers have excellent molding properties being much improved in this respect over polystyrene.

The cross-linked copolymers may be applied in the above mentioned fields either alone or in conjunction with other resins. In general the styrene copolymer is compatible with the same resins with which styrene itself is compatible. This includes resins such as the coumarone-indene type, polymerized butadiene, and polyisobutylene.

Although copolymers having percentages of 4,4'-divinyl-biphenyl higher than 5 percent have increasing rigidity, higher amounts of the divinylbiphenyl may be used if products having higher rigidity at high temperatures are desired. The invention, therefore, is not limited to use of the lower percentages of cross-linking agent illustrated in the examples.

I claim as my invention:

1. A resinous copolymer composition comprising the product of copolymerization of a mass comprising styrene and an amount of 4,4'-divinyl-biphenyl equal to from 1 to 5 percent by weight of the styrene.

2. A composition according to claim 1 in which the amount of 4,4'-divinyl-biphenyl is equal to 1 to 3 percent by weight of the styrene.

3. A method of preparing a resinous copolymer comprising mixing together styrene and an amount of 4,4'-divinyl-biphenyl equal to from 1 to 3 percent by weight of the styrene and heating until polymerization is complete.

4. A method of preparing a resinous copolymer comprising mixing together styrene and an amount of 4,4'-divinyl-biphenyl equal to 1 to 5 percent by weight of the styrene, in the presence of a polymerization catalyst and heating until polymerization is complete.

5. A method of preparing a resinous copolymer comprising mixing together styrene and an amount of 4,4'-divinyl-biphenyl equal to 1 to 5 percent by weight of the styrene, in the presence of a small amount of benzoyl peroxide as a polymerization catalyst and heating until polymerization is complete.

6. A method of preparing a resinous copolymer comprising making an aqueous dispersion of styrene and an amount of 4,4'-divinyl-biphenyl equal to 1 to 5 percent by weight of the styrene and heating until polymerization is complete.

7. A method of preparing a resinous copolymer comprising making an aqueous dispersion of styrene and an amount of 4,4'-divinyl-biphenyl equal to 1 to 5 percent by weight of the styrene, in the presence of a polymerization catalyst, and heating until polymerization is complete.

8. A method of preparing a resinous copolymer comprising mixing together styrene and an amount of 4,4'-divinyl-biphenyl equal to from 1 to 5 percent by weight of the styrene and heating until polymerization is complete.

FRITZ ROSENTHAL.

No references cited.